United States Patent Office 3,108,216
Patented Oct. 22, 1963

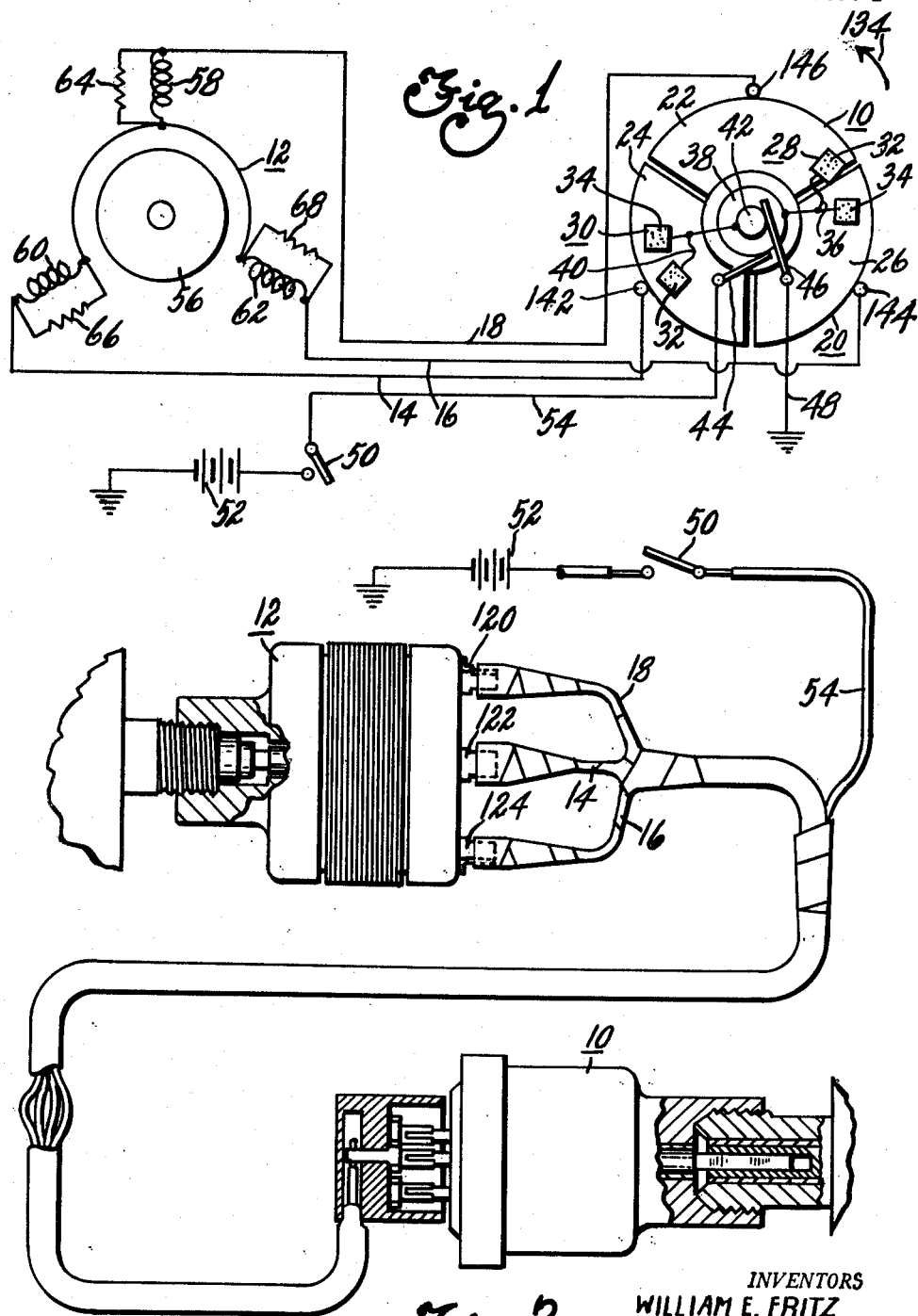
Oct. 22, 1963     W. E. FRITZ ETAL     3,108,216
ELECTRIC SPEEDOMETER DRIVE
Filed Dec. 3, 1959     3 Sheets-Sheet 1
INVENTORS
WILLIAM E. FRITZ
DONALD W. LAVIANA
BY
THEIR ATTORNEY

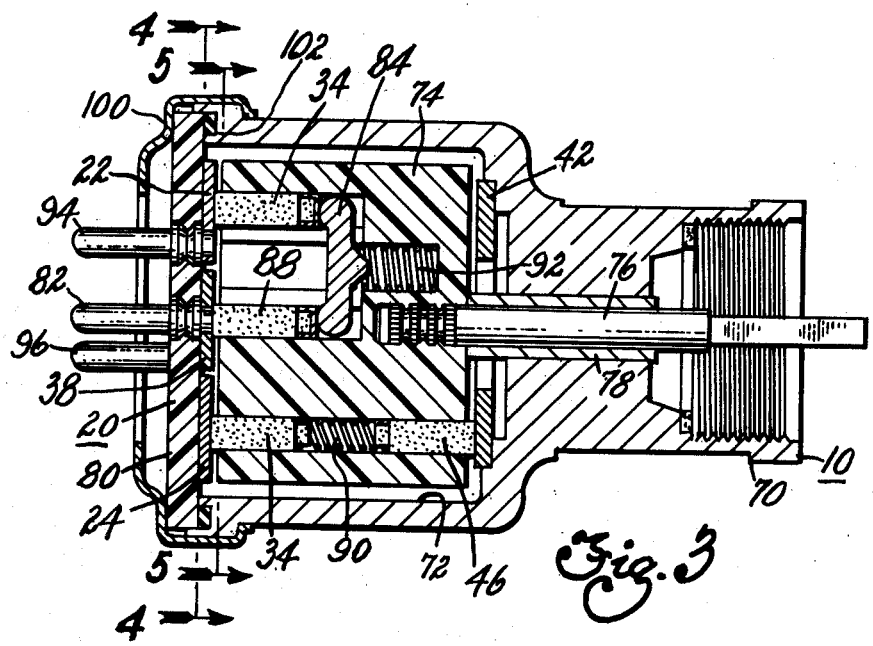

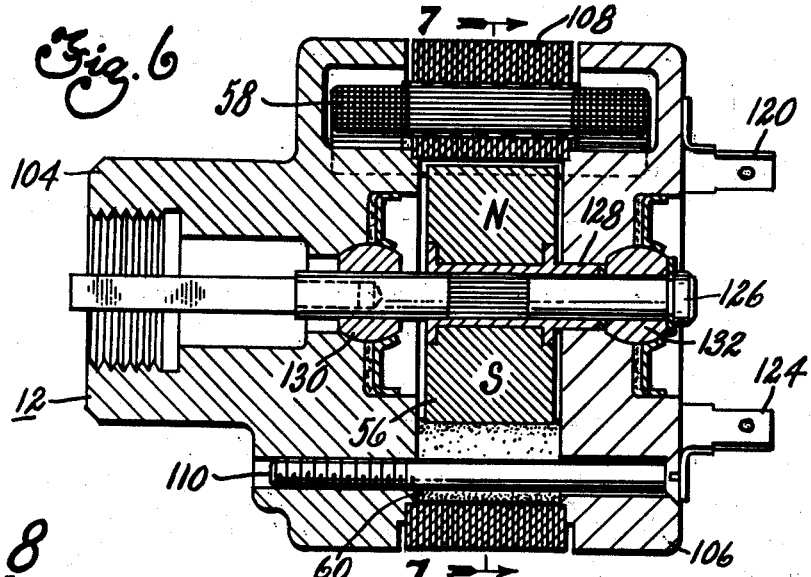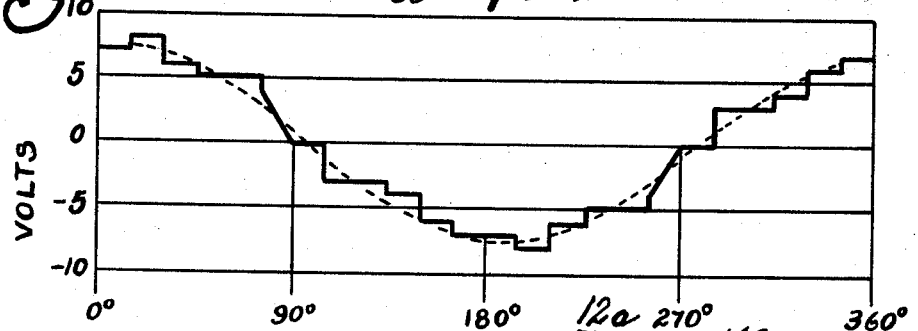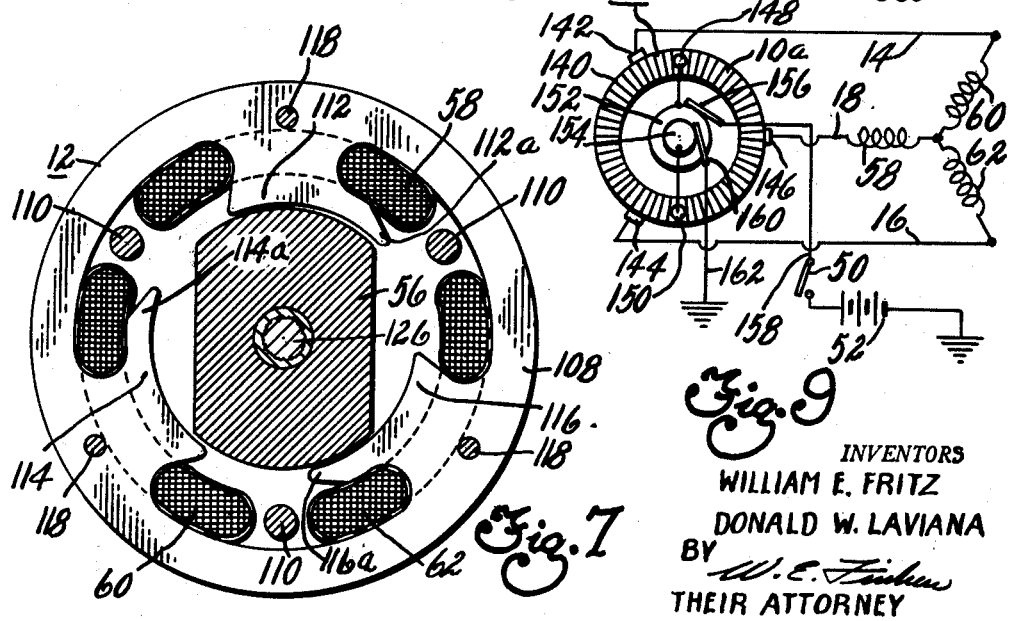

3,108,216
ELECTRIC SPEEDOMETER DRIVE
William E. Fritz, Rochester, and Donald W. Laviana, Pittsford, N.Y., assignors to General Motors Corporation, Detroit, Mich., a corporation of Delaware
Filed Dec. 3, 1959, Ser. No. 857,012
4 Claims. (Cl. 321—49)

This invention pertains to the art of speed measurement, and particularly to an electric speedometer drive designed for motor vehicles.

Heretofore, it has been conventional to utilize a flexible cable drive between the transmission and the speedometer in motor vehicles. However, flexible cable drives have inherent disadvantages such as noise, and inaccuracy in transmitting motion from the transmission to the speedometer. Moreover, with the advant of transmissions mounted in the rear of the motor vehicle, the length of the speedometer drive cable, in some instances, will be prohibitive. The present invention relates to an improved speedometer drive of the electric type which is substantially noiseless in operation, greatly improves the accuracy of speed measurement, and prevents oscillation of the speed indicator due to road shock, etc. Accordingly, among our objects are the provision of an electric speedometer drive comprising a transmitter and a receiver; the further provision of an electric speedometer drive including a receiver having a permanent magnet motor with low inertia; the further provision of an electric speedometer drive including a transmitter of the commutator type having an output signal approximating a sine wave; and the still further provision of an electric speedometer drive including a transmitter comprising a rotary potentiometer.

The aforementioned and other objects are accomplished in the present invention by energizing the transmitter from the electrical system of the motor vehicle, and electrically connecting the transmitter and the receiver. Specifically, two embodiments of a transmitter are disclosed herein, both of which can be used with substantially the same receiver. The receiver comprises a three-phase synchronous motor having a permanent magnet rotor with three phase windings connected in Y. The rotor is composed of ceramic magnet material having low inertia while providing sufficient torque at high speeds.

In one embodiment, the transmitter comprises a stationary commutator having three circumferentially spaced segments of approximately 120° each. Two sets of rotary brushes engage the plate-type commutator, each set comprising two brushes. One set of brushes is connected to one terminal of the motor vehicle electrical system through a stationary slip ring, and the other set of brushes is connected through a stationary slip ring to the other terminal of the electrical system. By using two brushes in each set, the resultant wave form approximates a sine wave. In order to improve the performance of the system, the brushes in each set have different resistances, with the higher resistance brush leading the lower resistance brush during rotation across the commutator segments.

In a modified embodiment, the transmitter comprises a rotary potentiometer having two diametrically opposed contacts connected to terminals of the electrical system of the motor vehicle through slip rings. The potentiometer is in the form of an annulus having three taps 120° apart. The resultant wave form produced by the potentiometer is a pure sine wave. The resistance element of the potentiometer may be either wound wire or carbon.

Further objects and advantages of the present invention will be apparent from the following description, reference being had to the accompanying drawings, wherein preferred embodiments of the present invention are clearly shown.

In the drawings:

FIGURE 1 is a schematic diagram of the receiver and transmitter constructed according to one embodiment.

FIGURE 2 is a fragmentary view, partly in elevation and partly in section, illustrating the transmitter and receiver constructed according to the first embodiment of this invention.

FIGURE 3 is an enlarged longitudinal sectional view of the transmitter constructed according to the first embodiment.

FIGURES 4 and 5 are, respectively, sectional views taken along lines 4—4 and 5—5 of FIGURE 3.

FIGURE 6 is an enlarged longitudinal sectional view of the receiver.

FIGURE 7 is a sectional view taken along line 7—7 of FIGURE 6.

FIGURE 8 is a graph depicting the wave form of the signals produced by the transmitter constructed according to the first and second embodiments (only one phase being shown).

FIGURE 9 is a schematic diagram illustrating the receiver and the transmitter constructed according to the second embodiment.

With particular reference to FIGURE 1, the electric speedometer drive includes a transmitter 10 and a receiver 12, the transmitter and receiver being interconnected by three wires 14, 16 and 18. The transmitter 10 includes a stationary plate-type commutator 20 having three spaced segments 22, 24 and 26, each subtending an angle of substantially 120°. The stationary commutator 20 is engaged by two sets of rotatable brushes 28 and 30. Each of the brush sets 28 and 30 comprises a high resistance brush 32 and a low resistance brush 34. The high and low resistance brushes of brush set 28 are interconnected as indicated by wire 36. This wire is connected to a slip ring 38. Similarly, the high and low resistance brushes of brush set 30 are interconnected by a wire 40 which in turn is connected to slip ring 42. Slip rings 38 and 42 are engaged, respectively, by brushes 44 and 46, brush 46 being connected to ground through wire 48, and the brush 44 being connected through an ignition switch 50 to one terminal of the storage battery 52 of the vehicle by a wire 54. The other terminal of the battery 52 is connected to ground.

The receiver 12 comprises a three-phrase synchronous motor having a permanent magnet rotor schematically indicated by numeral 56 in FIGURE 1. The stator of the receiver 12 has three salient poles energized by three windings 58, 60 and 62, connected in Y. In the first embodiment, the stator windings 58, 60 and 62 are shunted by resistors 64, 66 and 68, respectively, for limiting the amplitude of the induced voltages in the coils so as to prevent radio interference due to sudden make and break action of the transmitter.

Referring to FIGURES 2 through 5, the structure of transmitter 10 will be described. The transmitter 10 comprises a die cast housing 70 having a cup-shaped recess 72 in the larger diameter portion thereof. A brush drum assembly 74 composed of suitable electrical insulating material, such as phenolic resin, is coaxially disposed within the cup-shaped recess 72 and is attached to a drive shaft 76 rotatably supported by a bushing 78 in the housing 70. The drive shaft 76 is adapted to be coupled to a part of the motor vehicle transmission, or to any other rotating part of the vehicle which rotates in a constant, predetermined speed relationship to one or more of the vehicle wheels. The slip ring 42 is mounted in the bottom of the cup-shaped recess 72 and electrically connected to the metallic housing 70 which is in turn connected to ground.

The cup-shaped recess 72 is closed by the plate-type commutator 20 which comprises a base of suitable electrical insulating material 80 having the commutator segments 22, 24 and 26 thereon. In addition, the slip ring 38 is mounted on the disc 80 and connected to a terminal stud 82. The terminal stud 82 is adapted to be connected to the other terminal of the battery 52 as schematically indicated in FIGURE 1.

The grounded slip ring 42 is engaged by a pair of low resistance brushes 46, only one of which is depicted in FIGURE 3. The brushes 46 are disposed in cavities in the brush drum 74, the cavities also accommodating the low resistance brush 34 and the high resistance brush 32 of brush set 30. High resistance brush 32 and low resistance brush 34 of the brush set 28 are also supported in cavities in the brush drum 74. High resistance brush 32 of brush set 28 is connected by a brush jumper 84 to a high resistance brush 86, while low resistance brush 34 of the brush set 28 is connected by a second brush jumper 84 to a low resistance brush 88. The brushes 86 and 88 constitute the equivalent of the schematically indicated brush 44 in FIGURE 1 and engage the slip ring 38.

The brushes 46 and the brushes 32 and 34, of the brush set 30 are urged outwardly into engagement with the slip ring 42 and the commutator segments, respectively, by coil springs 90. The brushes 32 and 34 of the brush set 28 as well as the brushes 86 and 88 are urged into engagement with the commutator segments and the slip ring 38, respectively, through the brush jumpers 84 by springs 92. The commutator segments 22, 24 and 26 are connected to terminal studs 94, 96 and 98, respectively. The commutator 20 is held in assembled relation with the housing 70 by an apertured cap 100, the rim of which is spun over a flange on the housing 70. An O-ring seal 102 is interposed between the surface of the commutator plate 80 and the housing 70.

With reference to FIGURES 2, 6 and 7, the structure of the receiver 12 will be described. The receiver comprises a two-part frame, the parts being indicated by numerals 104 and 106. The stator of the receiver comprises a stack of laminations 108 held in assembled relation between the frame members 104 and 106 by a plurality of tie bolts, such as indicated by numeral 110. As seen in FIGURE 7, each stator lamination is formed with three salient poles 112, 114 and 116. The several laminations comprising the stator 108 are initially held in assembled relation with each other by a plurality of rivets 118. The salient poles are formed with unsymmetrical pole tips to facilitate ready assembly of the prewound coils 58, 60 and 62 therewith. To assemble the prewound coils on the salient poles, it is only necessary to slip the coil over the pole tip extensions 112a, 114a and 116a after which the other side is slipped over the other side of the salient poles.

As aforementioned, the coils 58, 60 and 62 are connected in Y, and the coils 58, 60 and 62 are connected to terminals 120, 122 and 124 supported on the frame member 106. The terminal 120 is connected to wire 18, the terminal 122 is connected to wire 14 and the terminal 124 is connected to the wire 16.

The rotor 56 comprises a ceramic permanent magnet which is magnetized in the direction of the diameter so as to have two poles, as indicated in FIGURE 6. The rotor 56 is attached to a shaft 126 by die cast metal 128. The shaft 126 is in turn supported by self-aligning bearings 130 and 132 in the frame members 104 and 106, respectively. The shaft 126 is adapted to be connected to the rotatable magnet of a conventional speedometer.

One of the essential requirements of the receiver 12 is to have a rotor with low inertia. In addition, it is essential to have a rotor in the receiver which provides sufficient torque at high speeds. These two requirements can be obtained with a ceramic magnet as described hereinbefore.

With reference to FIGURES 1 and 8, operation of the electric speedometer drive is as follows. When the ignition switch 50 is closed, power is supplied to the brush sets 28 and 30. As the brush drum 74 rotates relative to the stationary commutator 20, the direct current voltage from the battery 52 is converted to three phase alternating current having a frequency proportional to the rotative speed of the brush drum 74, and hence motor vehicle speed. Thus, the transmitter operates as an inverter. Two brushes are used in each set to obtain a stair case type wave form from each commutator segment which approximates a sine wave, as clearly shown in the solid lines of the graph in FIGURE 8. The brush drum rotates in the direction of the arrow 134 in FIGURE 1 with the high resistance brush of each brush set leading the low resistance brush. This arrangement improves the performance of the system so that the resulting wave form will approximate a sine wave. The high resistance brush of each brush set theoretically has a voltage drop two volts greater than the low resistance brush with a direct current power source of twelve volts.

The alternating current produced by the transmitter is fed by wires 14, 16 and 18 to the three phase windings of the receiver 12 thereby imparting rotation to the rotor 56 of the receiver in exact synchronism with the speed of rotation of the brush drum 74.

Referring to FIGURE 9, a modified embodiment of an electric speedometer drive is schematically depicted wherein the transmitter 10a comprises a potentiometer having an annular resistance element 140 with three taps 142, 144 and 146 located 120° apart. The resistor 140 is engaged by two diametrically opposed contacts 148 and 150 which are connected to slip rings 152 and 154, respectively. Slip ring 152 is engaged by a brush 156, the brush 156 being connected by wire 158 through ignition switch 50 to one terminal of the battery 52. The slip ring 154 is engaged by a brush 160 connected by a wire 162 to ground. The taps 142, 144 and 146 on the potentiometer are connected by wires 14, 16 and 18 to windings 60, 62 and 58, respectively, of the receiver 12a, the receiver 12a differing from the receiver 12 of the first embodiment only in that the shunting resistors are not required. Current always flows between the sliding contacts 148 and 150 through both halves of the resistor 140 thereby eliminating the sudden make and break of the commutator-type transmitter of the first embodiment. For this reason the shunting resistors depicted in connection with the receiver 12 are not required.

Operation of the modified transmitter and receiver is substantially the same as the first embodiment in that the contacts 148 and 150 are driven at a speed proportional to vehicle speed, but in this instance the resulting three phase alternating current signal is of the pure sine wave type as indicated by the dotted lines in the graph of FIGURE 8. In the modified receiver and transmitter of FIGURE 9, better performance is achieved, since oscillations of the speedometer needle are not apparent. The ring resistor 140 can be made of either wire or carbon.

While the embodiments of the invention herein disclosed constitute preferred forms, it is to be understood that other forms might be adopted.

What is claimed is as follows:

1. A transmitter for an electric speedometer drive including, a housing having a cup-shaped recess, a rotatable brush drum coaxially disposed within said recess, a drive shaft rotatably supported in said housing and connected to said brush drum, a stationary disc type commutator attached to said housing and closing the open end of said cup-shaped recess, said commutator having three circumferentially spaced segments thereon, and a pair of diametrically opposed brush sets carried by said brush drum and engaging said commutator segments, said pair of brush sets being connected to a source of direct current whereby rotation of the brush drum relative to the commutator will produce a three phase alternating current signal having a frequency proportional to the rotative speed of said drive shaft, each brush set comprising a pair of angularly spaced, electrically interconnected brushes.

2. The transmitter set forth in claim 1, wherein the two brushes of each brush set have different ohmic resistances.

3. The transmitter set forth in claim 2, wherein the higher resistance brush of each brush set leads the lower resistance brush during rotation of said brush drum.

4. A transmitter for an electric speedometer drive, a housing having a cup-shaped recess therein, a brush drum coaxially disposed within said cup-shaped recess, a drive shaft rotatably supported by said housing and connected to said brush drum, a stationary slip ring disposed within the bottom of said cup-shaped recess and spaced from said brush drum, a disc of insulating material closing the open end of said cup-shaped recess and having three circumferentially spaced commutator segments thereon and a centrally located stationary slip ring, a diametrically opposed pair of brush sets carried by said brush drum and engaging said commutator segments, a pair of brushes electrically connected to one of said brush sets and engaging the slip ring on said insulating disc, and a pair of brushes electrically connected to said other brush set and engaging said stationary slip ring located adjacent the bottom of said recess, said slip rings being connected to said source of direct current whereby rotation of said brush drum relative to said commutator will produce a three phase alternating current signal having a frequency proportional to the rotative speed of said drive shaft.

References Cited in the file of this patent

UNITED STATES PATENTS

| | | |
|---|---|---|
| 1,183,883 | Koppitz | May 23, 1916 |
| 1,204,740 | Bullock | Nov. 14, 1916 |
| 1,371,096 | Howe et al. | Mar. 8, 1921 |
| 2,327,341 | Drake | Aug. 24, 1943 |
| 2,523,993 | McCandless | Sept. 26, 1950 |
| 2,649,559 | Wargo | Aug. 18, 1953 |
| 2,836,743 | Braun | May 27, 1958 |

FOREIGN PATENTS

| | | |
|---|---|---|
| 42,764 | Sweden | Dec. 30, 1915 |